United States Patent [19]

Dubuisson

[11] Patent Number: 5,038,877
[45] Date of Patent: Aug. 13, 1991

[54] VEHICLE INSTRUMENT PANEL WITH COUNTER RESETTING KNOB

[75] Inventor: Georges Dubuisson, Orgeval, France

[73] Assignee: Societe d' Applications Generales d'Electricite et de Mecanique Sagem, France

[21] Appl. No.: 515,201

[22] Filed: Apr. 27, 1990

[30] Foreign Application Priority Data

May 2, 1989 [FR] France .............................. 89 05799

[51] Int. Cl.⁵ ............................................. B60K 20/08
[52] U.S. Cl. ....................................... 180/90; 297/70; 74/526; 74/553; 16/DIG. 6
[58] Field of Search ............................. 180/90; 280/752; 16/121, 122, DIG. 5, DIG. 6, DIG. 30; 74/502, 526, 527, 553; 297/70; 235/95 R, 96

[56] References Cited

U.S. PATENT DOCUMENTS

| 4,051,916 | 10/1977 | Oda | 180/90 |
| 4,448,276 | 5/1984 | Nakamoto et al. | 180/90 |
| 4,475,614 | 10/1984 | Takamatsu et al. | 180/90 |
| 4,540,070 | 9/1985 | Yonovich et al. | 16/DIG. 6 |
| 4,724,918 | 2/1988 | Raineri | 180/90 |

FOREIGN PATENT DOCUMENTS 2065492 7/1971 France .

Primary Examiner—Richard A. Bertsch
Attorney, Agent, or Firm—Rosenman & Colin

[57] ABSTRACT

A vehicle instrument panel is disclosed with counter resetting knob, comprising a push knob for resetting a trip recorder and mounted for sliding through a raised portion and a window. The knob comprises an end-piece with radial fins whose widened ends are situated between the raised portion and the window. Under the action of a compression spring the widened ends of the fins are urged towards the window, thus eliminating any play between the hole in the window and the end-piece.

8 Claims, 1 Drawing Sheet

VEHICLE INSTRUMENT PANEL WITH COUNTER RESETTING KNOB

BACKGROUND OF THE INVENTION

The present invention relates to a vehicle instrument panel, comprising a raised portion pierced with windows, or holes, displaying counting and measuring instrument dials, mounted between an internal casing and, with interpositioning of a window pierced with a hole, an external frame, and a knob for resetting a counter, mounted for sliding against the action of return means through the raised portion and the hole in the window.

One of the instruments available to the driver of a motor vehicle is a trip recorder. Contrary to the cumulative mileage indicator, it is a counter, generally kilometric and hectometric, that the driver may reset, for example between two journeys, by means of a cylindrical push knob mounted on a return spring and projecting from the window of the instrument panel through a hole and so accessible to the driver. Generally again, the distances travelled are indicated on a plurality of adjacent wheels having at their periphery the FIGS. 0 to 9.

It is known that small noises irritate car drivers. Because of the inevitable vibrations which occur in a travelling vehicle, the relative dimensions of the push knob and the hole in the window, a certain flexibility and slight mobility of the window, the resetting knob may knock against the edge of the hole in the window and thus create one of these small irritating noises.

The purpose of the present invention is to eliminate this phenomenon.

SUMMARY OF THE INVENTION

For this, the present invention relates to a vehicle instrument panel of the above defined type, characterized in that the knob comprises a bell-mouth shaped portion whose widest section part, greater than the section of the hole in the window, is returned towards the window by return means.

With the invention, the resetting knob in the rest position cooperates with the edge of the hole in the window by a portion whose section is substantially the same as that of the window, so that there is no radial play, no risk of one knocking against the other so no risk of noise.

The widest section part of the bell-mouth portion of the knob may be situated inside, between the raised portion and the window. In this case, the knob is a push knob and the return means, advantageously a compression spring, return it outwardly.

. The widest section part of the bell-mouth portion of the knob may be situated outside the window. In this case, the knob is a pull knob and the return means, advantageously a traction spring, return it inwardly.

Preferably, the bell-mouth portion of the knob is a conical envelope portion. In this case, more advantageously again, the knob comprises ribs or fins.

BRIEF DESCRIPTION OF THE DRAWINGS

The invention will be better understood from the following description of a preferred embodiment of the instrument panel of the invention, with reference to the accompanying drawings, in which.

DESCRIPTION OF THE PREFERRED EMBODIMENTS

Figure 1:
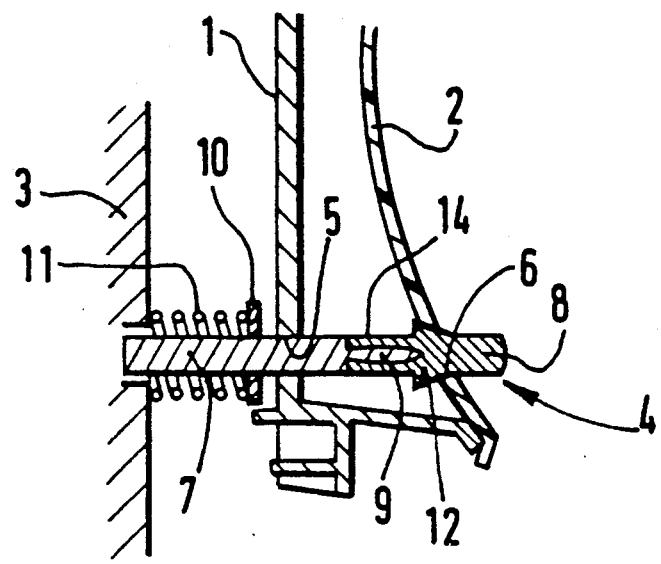
FIG. 1 shows a partial cross sectional view of the instrument panel of the invention.
Figure 2:
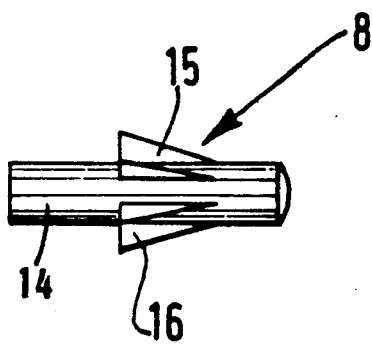
FIG. 2 is a view, on a larger scale, of the end-piece for actuating the resetting knob of trip recorder of the instrument panel of FIG. 1.

The motor vehicle instrument panel shown in the drawings comprises, between an inner casing and an outer frame, not shown, a raised portion 1 shaped so as to receive a concave window 2 made from transparent and non-dazzle resin, these four elements being assembled together by conventional means. Frame here is more or less synonymous with external frame and raised portion synonymous with bodywork or intermediate casing.

A trip recorder 3 recording unit distances travelled by the vehicle is fixed to the casing, behind the raised portion, and may be reset by a push knob 4 mounted for sliding through a guide bore formed in the raised portion and a hole 6 formed in the window.

The push knob comprises, projecting from apparatus 3, a rod 7 with an end portion 9 of narrowed section on which is force fitted an actuating end-piece 8 projecting outside the window, considering the section of rod 7, that of bore 5 of the raised portion and the depth of this bore, rod 7 is perfectly guided in this bore.

A clip 10 is engaged on rod 7 to serve as bearing point for one of the ends of a compression spring 11 whose other end bears against apparatus 3.

The end-piece 8, having opposite its actuating end a skirt 14 fitted on portion 9 of rod 7 and of a section slightly smaller than that of the hole 6 in window 2, comprises a rearward bell-mouth portion 12. i.e. between the raised portion and the window, whose widest section 16 is larger than the section of hole 6. This bellmouth portion comprises a set of triangular radial fins 15, here identical and six in number, consequently enveloped by a fictitious conical surface bell-mouthed towards the inside, here also rearward. Fins 15 are spaced evenly apart at the periphery of end-piece 8.

The end-piece 8, via rod 7, is urged by spring 11 towards the outside and the widened ends 16 of fins 15 are urged towards window 2, an intermediate portion of the fins 15 abutting against the window 2, without radial play between them and the lateral edge of hole 6. If end-piece 8 is made from a relatively flexible material, with low hardness, for example from an elastomer plastic, the elimination of the radial play may even be combined with slight locking of the end-piece in the window. To reset the trip recorder 3, it is sufficient to push end-piece 8 inwardly, i.e. towards the raised portion 1, which frees fins 15 from the edge of hole 6 of window 2.

What is claimed is:

1. Vehicle instrument panel comprising a raised portion, formed with holes for displaying measuring and counting instrument dials, mounted between an inner casing and, with interpositioning of a window formed with a hole, an external frame, and a knob for resetting a counter and mounted for sliding against return means through the raised portion and the hole in the window, wherein the knob comprises a bell-mouth portion whose widest section part, larger than the section of the hole in the window, is returned towards the window by the return means.

2. The panel as claimed in claim 1, wherein said return means comprise a traction spring.

3. The panel as claimed in claim 1, wherein the widest section part of the bell-mouth portion of the knob is situated inside, between the raised portion and the window.

4. The panel as claimed in claim 3, wherein said return means comprise a compression spring.

5. The panel as claimed in claim 1, wherein said bell-mouth portion of the knob is a portion with conical envelope.

6. The panel as claimed in claim 5, wherein said bell-mouth portion of the knob comprises fins.

7. The panel as claimed in claim 6, wherein the fins are radial and triangular fins.

8. The panel as claimed in claim 1, wherein the resetting knob is made from a flexible material.

* * * * *